3,185,085
METHOD OF ADDING HYDROPHOBIC IMAGES TO THE HYDROPHILIC SURFACE OF POSITIVE OR NEGATIVE PAPER OFFSET PLATES

Clifford E. Herrick, Jr., Concord, Mass., and Armin E. Wimmer, Vestal, N.Y., assignors to General Aniline & Film Corporation, New York, N.Y., a corporation of Delaware
No Drawing. Filed Jan. 9, 1961, Ser. No. 81,281
3 Claims. (Cl. 101—149.2)

The present invention relates to a method and means for creating handwritten or rubber stamp images on the hydrophilic surface of a processed sensitized paper offset plate in which the hydrophilic surface is a hydrolyzed copolymer of maleic anhydride and a vinyl alkyl ether such as is described in U.S. Patent 2,772,972.

The need for making changes or additions to the hydrophilic surface of the aforementioned plates has been recognized since their introduction to the market. Efforts have accordingly been made to provide a method or means by which such changes or additions could be made to thus extend the useful life of the plate. However, these efforts were doomed to failure primarily due to the rather peculiar nature of the hydrolyzed surface of the copolymer of maleic anhydride and the vinyl alkyl ether.

It has now been discovered that the hydrophilic surface of the processed plates can be amended by the addition of greasy, ink-receptive images by using an ink containing a base-soluble polyvinyl resin which is hydrophobic and volatile organic solvents for the resin. Such ink can be employed as an image former and applied to the plate surface by pen or stamp pad. The solvents used provide the proper writing characteristics on the smooth hydrophilic surface of the plates. When stored in an airtight container, the compositions have an extremely long shelf life.

Preparation of such compositions and their use to modify a processed plate of the type aforesaid constitute the purposes and objects of our invention.

The resins which we employ are, in the main, copolymers of a vinyl compound with another compound copolymerizable therewith. If such resins be hydrophilic, they can be readily converted to the hydrophobic state by treatment with an acidic material such as aluminum sulfate, hydrochloric acid or the like. The resins then precipitate from solution in a hydrophobic condition.

Examples of resins which we have found to be exceptionally suitable for our purposes are the copolymer of vinyl acetate and crotonic acid, the copolymer of vinyl acetate and acrylic acid, the copolymer of vinyl acetate and maleic acid, the copolymer of vinyl methyl ether and maleic acid, the copolymer of styrene and maleic anhydride, the copolymer of phenyl maleic anhydride and vinyl chloride, the copolymer of vinyl methyl ketone with itaconic acid, and the like. Such polymers are soluble in an inorganic base such as ammonium hydroxide, trisodium phosphate or the like.

While the resins used are soluble in an alkali such as ammonium hydroxide, which forms a part of the composition, volatile organic solvents are also used in order to ensure that the composition applies itself smoothly to the hydrophilic surface. Solvents which may be employed to this end are dimethyl formamide, methyl Cellosolve, methyl Cellosolve acetate, dioxane or the like.

The ink may be dyed any color and, to this end, we may use naphthylamine black dye (A4B), nigrosine or the like.

The solutions are ready for use immediately after mixing. They may be applied to the surface directly after the plate processing solutions have been removed. Thus, residual developer and fixer are first rinsed from the plate with water and for best results the plate surface should be clean and readily dried. The ink may be applied with pen, brush or rubber stamp. The ink dries in about 30 seconds, after which the plate can be run.

The invention is further illustrated by the following examples, but it is understood that the invention is not restricted thereo.

Example I

The surface of an exposed, developed and fixed sensitized positive offset paper plate, as described in U.S. Patent 2,772,972, is prepared to receive handwritten additions by rinsing with clear water and drying with a squeegee. Additions are made in desired areas using a suitable pen containing the following formula:

Copolymer of vinyl acetate and crotonic acid__ml__ 43.5
Water _____ml__ 56
Dimethyl formamide _____ml__ 110
Methyl Cellosolve acetate _____ml__ 100
Ammonium hydroxide (to pH 10)_____ml__ 2–3
Naphthylamine black dye (A4B) _____g__ 1

The visible written image dries within 30 seconds. The plate is then placed on the press and copies run. Images reproduce almost immediately.

Example II

The surface of an exposed, developed and fixed sensitized negative offset paper plate having a hydrophilic surface of hydrolyzed PVM/MA is prepared to receive handwritten additions by rinsing with clear water and drying with a squeegee. Additions are made in desired areas using a suitable pen containing the formula given in Example I. This solution can also be used in a rubber stamp pad. Written or stamped images are visible and dry within 30 seconds. On the press, added images reproduce almost immediately.

Example III

The surface of an exposed, developed and fixed sensitized positive offset plate of Example I is prepared to receive handwritten additions by rinsing with clear water and drying with a squeegee. Additions are made in the desired areas using a suitable pen containing the following formula:

PVM/MA (6% hydrolyzed) _____g__ 5
Dimethyl formamide _____ml__ 100
Methyl Cellosolve acetate _____ml__ 100
Naphthylamine black dye (A4B) _____g__ 1

The visible written image dries within 30 seconds. The plate is then placed on the press and copies run.

Modification of the invention will occur to persons skilled in the art. We, therefore, do not intend to be limited in the patent granted except as necessitated by the appended claims.

We claim:

1. A process of forming an offset printing plate comprising coating a base with a copolymer of vinyl methyl ether and maleic anhydride to form a first layer of the copolymer on said base, coating said copolymer layer with a composition comprising a mixture of an alkali resistant resin and a light-sensitive diazo oxide to form a second layer, exposing the thus formed plate to light under a pattern, removing the mixture from the exposed portions of said second layer by treatment with a polyhydroxy compound to thereby form a hydrophobic grease resistant image of the pattern on the plate, treating the plate with an alkylolamine to hydrolyze the portion of the surface of the copolymer of said first layer from which the mixture was removed, thereby rendering said portions hydrophilic, rinsing the thus formed plate with water to remove processing liquids, drying the plate and manually forming a second image on said hydrophilic portions by applying thereto an ink comprising an alkali soluble hydrophobic polyvinyl compound, an alkali and a volatile organic solvent.

2. A process of forming an offset printing plate as recited in claim 1 wherein the ink is applied by writing with a pen.

3. A process of forming an offset printing plate as recited in claim 1 wherein the ink is applied by stamping with a rubber stamp.

References Cited by the Examiner
UNITED STATES PATENTS

| | | | |
|---|---|---|---|
| 2,186,946 | 1/40 | Wood | 101—149.2 |
| 2,342,713 | 2/44 | Wescott | 101—149.2 |
| 2,503,679 | 4/50 | Newman | 101—149.2 |
| 2,635,537 | 4/53 | Worthen | 101—149.2 |
| 2,766,688 | 10/56 | Halpern et al. | 101—149.2 |
| 2,772,972 | 12/56 | Herrick et al. | |
| 2,983,220 | 5/61 | Dalton et al. | 101—149.2 |

WILLIAM B. PENN, *Primary Examiner.*

ROBERT A. LEIGHEY, ROBERT E. PULFREY,
*Examiners.*